United States Patent
Salaka et al.

(10) Patent No.: US 10,360,621 B2
(45) Date of Patent: Jul. 23, 2019

(54) NEAR-IDENTICAL MULTI-FACETED ENTITY IDENTIFICATION IN SEARCH

(71) Applicant: eBay Inc., San Jose, CA (US)

(72) Inventors: Vamsi Krishna Salaka, Fremont, CA (US); Marco Pennacchiotti, Mountain View, CA (US); Davide Libenzi, San Jose, CA (US); Timothy Bethea, Santa Clara, CA (US)

(73) Assignee: eBay Inc., San Jose, CA (US)

( * ) Notice: Subject to any disclaimer, the term of this patent is extended or adjusted under 35 U.S.C. 154(b) by 507 days.

(21) Appl. No.: 15/159,230

(22) Filed: May 19, 2016

(65) Prior Publication Data
US 2016/0342600 A1 Nov. 24, 2016

Related U.S. Application Data

(60) Provisional application No. 62/164,406, filed on May 20, 2015.

(51) Int. Cl.
| | | |
|---|---|---|
| *G06F 17/00* | (2019.01) | |
| *G06Q 30/06* | (2012.01) | |
| *G06F 16/248* | (2019.01) | |
| *G06F 16/33* | (2019.01) | |

(52) U.S. Cl.
CPC ....... *G06Q 30/0643* (2013.01); *G06F 16/248* (2019.01); *G06F 16/3347* (2019.01); *G06Q 30/0633* (2013.01)

(58) Field of Classification Search
CPC ......... G06F 17/30247; G06F 17/30569; G06F 17/30864
See application file for complete search history.

(56) References Cited

U.S. PATENT DOCUMENTS

| 7,366,718 B1 | 4/2008 | Pugh et al. |
| 2006/0101060 A1 | 5/2006 | Li et al. |
| 2008/0065630 A1 | 3/2008 | Luo et al. |

(Continued)

FOREIGN PATENT DOCUMENTS

| CN | 108140026 A | 6/2018 |
| WO | WO-2016187417 A1 | 11/2016 |

OTHER PUBLICATIONS

"International Application Serial No. PCT/US2016/033253, International Search Report dated Aug. 26, 2016", 2 pgs.

(Continued)

*Primary Examiner* — Truong V Vo
(74) *Attorney, Agent, or Firm* — Shook, Hardy & Bacon L.L.P.

(57) ABSTRACT

Example embodiments described herein disclose systems and methods for near-identical multi-faceted entity identification within search results from an online marketplace. The online marketplace may be or include a group of one or more server machines configured to provide one or more online marketplace services, including the near-identical multi-faceted entity identification system. A user device may accordingly request and receive, from the online marketplace, a set of item listings based on submitted search criteria. The online marketplace may then access the set of item listings and identify one or more similar item listings among the set of item listings in order to demote a ranking of the similar item listings within the set.

20 Claims, 7 Drawing Sheets

(56) References Cited

U.S. PATENT DOCUMENTS

2008/0243632 A1* 10/2008 Kane ................ G06F 17/30867
　　　　　　　　　　　　　　　　　　　705/14.66
2009/0259650 A1　 10/2009 Schuil
2009/0299853 A1* 12/2009 Jones .................... G06Q 30/02
　　　　　　　　　　　　　　　　　　　705/14.46
2011/0004608 A1　　1/2011 Solaro et al.

OTHER PUBLICATIONS

"International Application Serial No. PCT/US2016/033253, Written Opinion dated Aug. 26, 2016", 6 pgs.
International Preliminary Report on Patentability received for PCT Application No. PCT/US2016/033253, dated Nov. 30, 2017, 8 pages.
Extended European Search Report Received for European Patent Application No. 16797294.2, dated Sep. 24, 2018, 12 pages.

* cited by examiner

NEAR-IDENTICAL MULTI-FACETED ENTITY IDENTIFICATION IN SEARCH

CLAIM OF PRIORITY

This application claims the benefit of priority of U.S. Provisional Application Ser. No. 62/164,406, filed May 20, 2015, which is hereby incorporated by reference in its entirety.

TECHNICAL FIELD

The present application relates generally to data processing systems and, in one specific example, to techniques and applications for near identical, multi-faceted entity identification in search.

BACKGROUND

Websites have enabled users to search for and purchase a variety of products and services. It is becoming more commonplace for individuals to both shop for and sell products through online marketplaces. An online marketplace (or e-commerce marketplace) is a type of e-commerce site where product or service information is provided by multiple third parties, whereas transactions are processed by the marketplace operator. Online marketplaces are typically adapted to accommodate either very small-scale sellers who can manually enter and track a small number of items, or very large-scale sellers who form partnerships with selected online marketplaces.

A seller may create a listing for an item which may in turn be recalled and displayed within a set of search results by the online marketplace in response to a search request received from a buyer. Oftentimes, in order to gain an advantage over other sellers within an online marketplace, a seller may create multiple listings for a single item in order to garner more attention and views. As a result, search results may become congested with duplicative item listings and thus may not accurately indicate all available items from all sellers.

BRIEF DESCRIPTION OF THE DRAWINGS

Some embodiments are illustrated by way of example and not limitation in the figures of the accompanying drawings in which.

DETAILED DESCRIPTION

Figure 1:
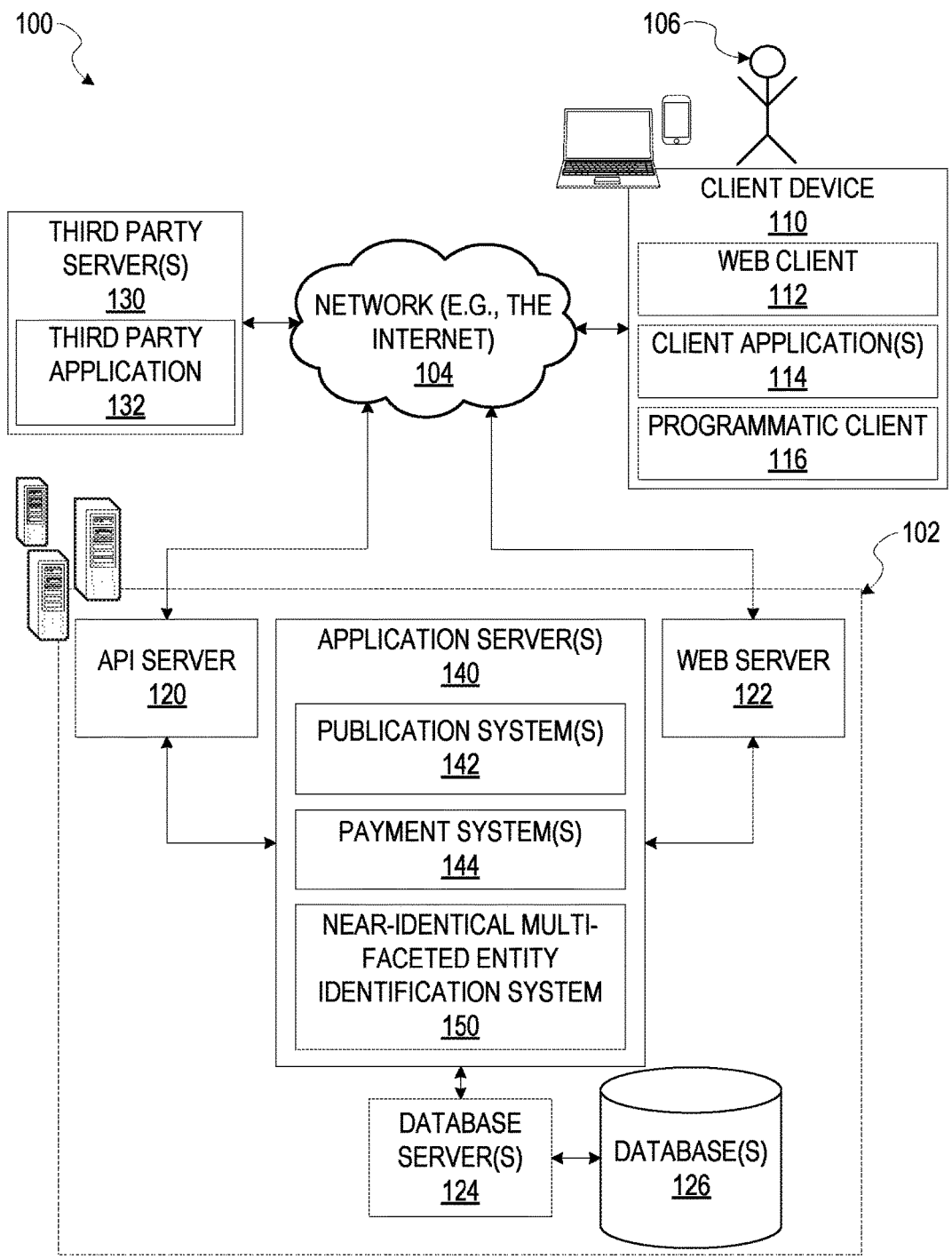
FIG. 1 is a network diagram depicting a client-server system, within which one example embodiment may be deployed.

Example embodiments described herein disclose systems and methods for near-identical multi-faceted entity identification within search results from an online marketplace. The online marketplace may be or include a group of one or more server machines configured to provide one or more online marketplace services, including the near-identical multi-faceted entity identification system. A user device may accordingly request and receive, from the online marketplace, a set of item listings based on submitted search criteria. The online marketplace may then access the set of item listings and identify one or more similar item listings among the set of item listings in order to demote a ranking of the similar item listings. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

The online marketplace is configured (e.g., by one or more suitable modules that include one or more processors) to retrieve and present search results (e.g., item listings) in a graphical user interface. For example, a user interacts with the online marketplace through a graphical user interface on a user device, by entering one or more search criteria into the graphical user interface, the search criteria identifying an item which the user desires to purchase. In response, the online marketplace retrieves corresponding search results to be presented in an ordered list, based on the relevance of the item listing to the received search criteria. Before causing the search results to display at the client device, the online marketplace identifies one or more equivalent item listings among the search results, and demotes the one or more equivalent listings such that they are displayed at the end of the ordered list. Having demoted the equivalent search results, the online marketplace causes the search results to display at the client device.

In addition, the online marketplace is configured (e.g., by one or more suitable modules that include one or more processors) to create item listings based on one or more user inputs received from a seller. For example, the seller may provide the online marketplace with one or more inputs defining components of the item listing, including, for example, a listing title, a category, an image, a price, and a description. In response, the online marketplace applies appropriate algorithms (e.g., a locality sensitive hashing algorithm) to generate a hash for each of the components of the item listing. In this context, a hash defines as a sequence of bits which describes an individual component of the item listing. In some example embodiments, multiple hashes may be written for each of the components. The online marketplace may then generate a signature for the item listing by combining each of the hashes of the item listing. The signature is then indexed and assigned to the item listing.

As an illustrative example from a user perspective, suppose a first user accesses the online marketplace to generate a first item listing for a single item he wishes to post for sale. The first user may provide the online marketplace with one or more item components, such as a listing title, a listing image, a description, and a price value. In response, the online marketplace generates and appends a signature to the first item listing for the single item. The online marketplace may then index and store the item listing, in order to retrieve the item listing, in response to receiving a search request identifying the item listing, based on search criteria.

Now, suppose that in order to increase the visibility of the single item for sale, the first user decides to generate ten more equivalent item listings to the first item listing. The first user may, for example, provide a similar listing title, a similar listing image, a similar price value, and a similar description to the online marketplace. In response, the online marketplace generates and appends signatures to each of the equivalent item listings, and indexes and stores the item listings.

A second user (e.g., a buyer) then provides the online marketplace with search criteria identifying or otherwise describing an item she wishes to purchase (e.g., the first item). Responsive to receiving the search criteria, the online marketplace retrieves a set of search results comprising a plurality of item listings. The plurality of item listings may include the first item listing created by the first user, as well as the ten duplicative item listings created by the first user. Upon retrieving the search results, the online marketplace accesses the signature of the first item listing, and by applying locality sensitive hashing (LSH) techniques, determines that the ten duplicative listings are, in fact, similar to the first item listing. LSH is an algorithm usable for detecting near duplicates. A general approach to LSH is to "hash" items several times, in such a way that similar items are more likely to be hashed to the same bucket than dissimilar items. Several LSH functions exist, each able to estimate a specific similarity measure (e.g., Jaccard, Cosine). As a result, an advantage of LSH is that, by relying on hashes, the computation of similarity across n items can be performed in $O(n)$, instead of $O(n)^2$.

Having identified that the ten duplicative listings are similar to the first item listing, the online marketplace may modify an order of the search results by, for example, demoting the equivalent item listings to the end of the set of search results. Thus, only single item listings for each physical item may be displayed in the set of search results presented to the client device.

With reference to FIG. 1, an example embodiment of a high-level client-server-based network architecture 100 is shown. A networked system 102, in the example forms of a network-based marketplace or payment system, provides server-side functionality via a network 104 (e.g., the Internet or wide area network (WAN)) to one or more client devices 110. FIG. 1 illustrates, for example, a web client 112 (e.g., a browser, such as the Internet Explorer® browser developed by Microsoft® Corporation of Redmond, Wash. State), an application 114, and a programmatic client 116 executing on client device 110.

The client device 110 may comprise, but is not limited to, a mobile phone, desktop computer, laptop, portable digital assistant (PDA), smart phone, tablet, ultra book, netbook, laptop, multi-processor system, microprocessor-based or programmable consumer electronics, game console, set-top box, or any other communication device that a user may utilize to access the networked system 102. In some embodiments, the client device 110 may comprise a display module (not shown) to display information (e.g., in the form of user interfaces). In further embodiments, the client device 110 may comprise one or more of touch screens, accelerometers, gyroscopes, cameras, microphones, global positioning system (GPS) devices, and so forth. The client device 110 may be a device of a user that is used to perform a transaction involving digital items within the networked system 102. In one embodiment, the networked system 102 is a network-based marketplace that responds to requests for product listings, publishes publications comprising item listings of products available on the network-based marketplace, and manages payments for these marketplace transactions. One or more users 106 may be a person, a machine, or other means of interacting with client device 110. In embodiments, the user 106 is not part of the network architecture 100, but may interact with the network architecture 100 via client device 110 or another means. For example, one or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WiFi network, a WiMax network, another type of network, or a combination of two or more such networks.

Each of the client devices 110 may include one or more applications 114 (also referred to as "apps") such as, but not limited to, a web browser, messaging application, electronic mail (email) application, an e-commerce site application (also referred to as a marketplace application), and the like. In some embodiments, if the e-commerce site application is included in a given one of the client device 110, then this application 114 is configured to locally provide the user interface and at least some of the functionalities with the application 114 configured to communicate with the networked system 102, on an as needed basis, for data and/or processing capabilities not locally available (e.g., access to a database of items available for sale, to authenticate a user, to verify a method of payment, etc.). Conversely, if the e-commerce site application is not included in the client device 110, the client device 110 may use its web browser to access the e-commerce site (or a variant thereof) hosted on the networked system 102.

One or more users 106 may be a person, a machine, or other means of interacting with the client device 110. In example embodiments, the user 106 is not part of the network architecture 100, but may interact with the network architecture 100 via the client device 110 or other means. For instance, the user 106 provides input (e.g., touch screen input or alphanumeric input) to the client device 110 and the input is communicated to the networked system 102 via the network 104. In this instance, the networked system 102, in response to receiving the input from the user 106, communicates information to the client device 110 via the network 104 to be presented to the user 106. In this way, the user 106 can interact with the networked system 102 using the client device 110.

An application program interface (API) server 120 and a web server 122 are coupled to, and provide programmatic and web interfaces respectively to, one or more application servers 140. The application servers 140 may host one or more publication systems 142 and payment systems 144, each of which may comprise one or more modules or applications and each of which may be embodied as hardware, software, firmware, or any combination thereof. The application servers 140 are, in turn, shown to be coupled to one or more database servers 124 that facilitate access to one or more information storage repositories or database(s) 126.

In an example embodiment, the databases 126 are storage devices that store information to be posted (e.g., publications or listings) to the publication system 142. The databases 126 may also store digital item information in accordance with example embodiments.

Additionally, a third party application 132, executing on third party server(s) 130, is shown as having programmatic access to the networked system 102 via the programmatic interface provided by the API server 120. For example, the third party application 132, utilizing information retrieved from the networked system 102, supports one or more features or functions on a website hosted by the third party. The third party website, for example, provides one or more promotional, marketplace, or payment functions that are supported by the relevant applications of the networked system 102.

The publication systems 142 may provide a number of publication functions and services to users 106 that access the networked system 102. The payment systems 144 may likewise provide a number of functions to perform or facilitate payments and transactions. While the publication system 142 and payment system 144 are shown in FIG. 1 to both form part of the networked system 102, it will be appreciated that, in alternative embodiments, each system 142 and 144 may form part of a payment service that is separate and distinct from the networked system 102. In some embodiments, the payment systems 144 may form part of the publication system 142.

The near-identical multi-faceted entity identification system 150 may provide functionality operable to perform various functions to identify similar item listings among a set of search results, according to some example embodiments. For example, the near-identical multi-faceted entity identification system 150 may access a set of search results from the databases 126, the third party servers 130, the publication system 142, and other sources. In some example embodiments, the near-identical multi-faceted entity identification system 150 may analyze the set of search results in order to identify and demote similar item listings. In an alternative embodiment, the near-identical multi-faceted entity identification system 150 may be a part of the publication system 142.

Further, while the client-server-based network architecture 100 shown in FIG. 1 employs a client-server architecture, the present inventive subject matter is of course not limited to such an architecture, and could equally well find application in a distributed, or peer-to-peer, architecture system, for example. The various publication system 142, payment system 144, and near-identical multi-faceted entity identification system 150 could also be implemented as standalone software programs, which do not necessarily have networking capabilities.

The web client 112 may access the various publication and payment systems 142 and 144 via the web interface supported by the web server 122. Similarly, the programmatic client 116 accesses the various services and functions provided by the publication and payment systems 142 and 144 via the programmatic interface provided by the API server 120. The programmatic client 116 may, for example, be a seller application (e.g., the Turbo Lister application developed by eBay® Inc., of San Jose, Calif.) to enable sellers to author and manage listings on the networked system 102 in an off-line manner, and to perform batch-mode communications between the programmatic client 116 and the networked system 102.

Figure 2:
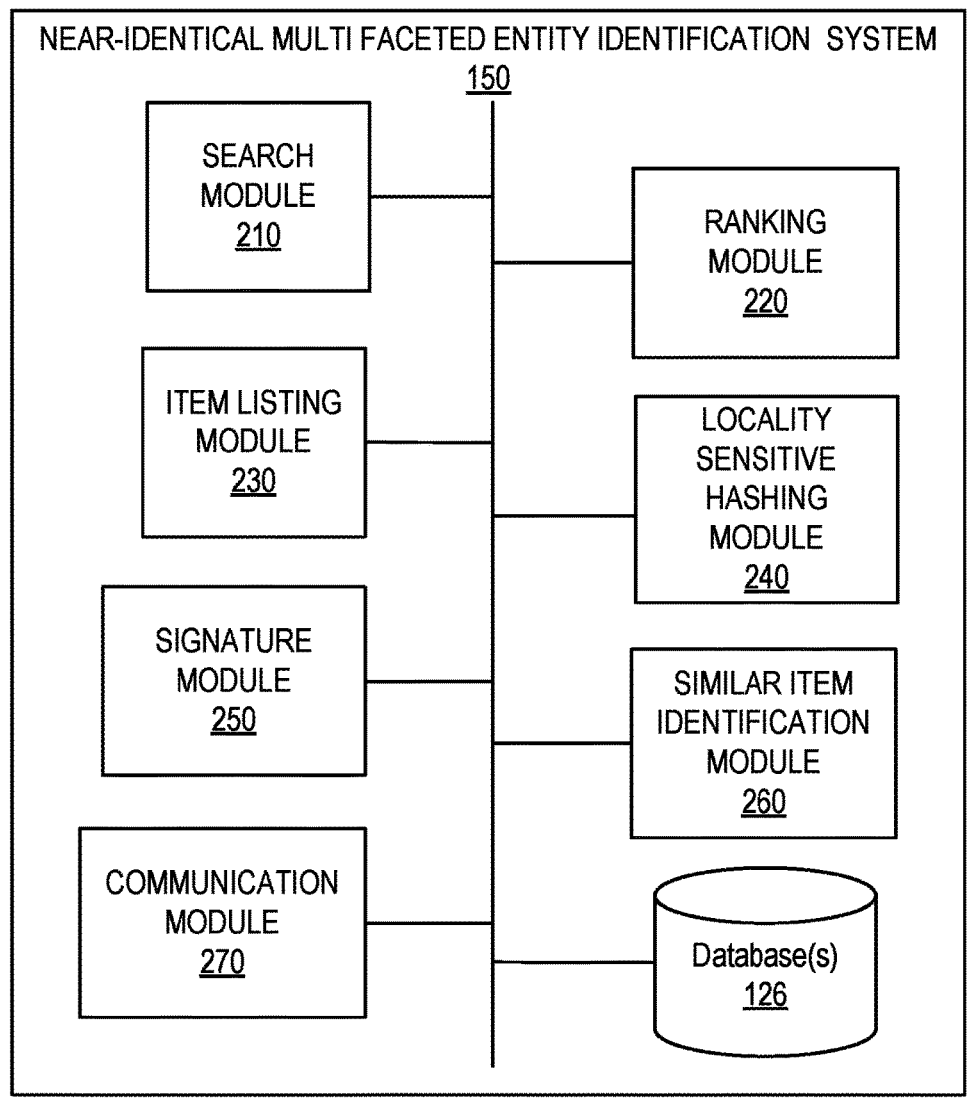
FIG. 2 is a block diagram illustrating various modules of the near-identical multi-faceted entity identification system, according to some example embodiments.

FIG. 2 is a block diagram illustrating various functional modules of the near-identical multi-faceted entity identification system 150, consistent with some embodiments. The near-identical multi-faceted entity identification system 150 is shown as including: a search module 210; a ranking module 220; an item listing module 230; a locality sensitive hashing module 240; a signature module 250; a similar item identification module 260; and a communication module 270. The various modules of the near-identical multi-faceted entity identification system 150, may, furthermore, access the database 126 via the database server 124, and each of the various modules of the near-identical multi-faceted entity identification system 150 may be in communication with one or more of the third party applications 132 (e.g., a social network platform). Further, while the modules of FIG. 2 are discussed in the singular sense, it will be appreciated that, in other embodiments, multiple modules may be employed.

Any one or more of the modules described may be implemented using hardware alone (e.g., one or more of the processors of a machine) or a combination of hardware and software. For example, any module described of the near-identical multi-faceted entity identification system 150 may physically include an arrangement of one or more of the processors (e.g., a subset of or among the one or more processors of the machine) configured to perform the operations described herein for that module. As another example, any module of the near-identical multi-faceted entity identification system 150 may include software, hardware, or both, that configure an arrangement of one or more processors (e.g., among the one or more processors of the machine) to perform the operations described herein for that module. Accordingly, different modules of the near-identical multi-faceted entity identification system 150 may include and configure different arrangements of such processors or a single arrangement of such processors at different points in time. Moreover, any two or more modules of the near-identical multi-faceted entity identification system 150 may be combined into a single module, and the functions described herein for a single module may be subdivided among multiple modules. Furthermore, according to various example embodiments, modules described herein as being implemented within a single machine, database 126, or device may be distributed across multiple machines, databases 126, or devices.

The search module 210 is configured to receive search requests from a client device (e.g., client device 110), and based on the search request, retrieve search results to be presented at the client device 110. The search request may include search criteria describing or identifying items, such as products or services in an online marketplace. For example, a user 106 may provide one or more search criteria (e.g., an item type, price, description) to a graphical user interface of the marketplace application via a client device 110 (e.g., a mobile device). The search module 210 is configured to receive the search criteria, and based on the search criteria, retrieve a set of search results (e.g., from the database(s) 126, or third party server 130). In some example embodiments, the set of search results may comprise one or more item listings generated by various modules of the marketplace application and payment application.

The ranking module 220 is configured to sort the set of search results retrieved by the search module 210. For example, the ranking module 220 may be configured to automatically sort the set of search results based on a relevance of the search results to the received search criteria. In other example embodiments, the ranking module 220 may enable the user 106 to provide additional sorting criteria, and may order the set of search results based on the provided sorting criteria, such as price (e.g., high to low, or low to high), location (e.g., nearest to furthest, or furthest to nearest), and time (e.g., ending first). In addition, and as will be discussed in greater detail below, the ranking module 220 is configured to modify (e.g., by demoting item listings) the order of a set of search results based on feedback received from the various modules of the near-identical multi-faceted entity identification system 150.

The item listing module 230 is configured to generate an item listing based on one or more inputs received from a client device (e.g., client device 110). For example, the listing module 230 may allow sellers to author and manage listings for products or services. Specifically, a user 106 (e.g., a seller) may provide the item listing module 230 with a number of item features and descriptions, including, for example, a listing title, an image, an item description, and a price. Responsive to receiving the item features and descriptions, the item listing module 230 generates an item listing.

The locality sensitive hashing (LSH) module 240 is configured to receive listings generated by the item listing module 230, and apply LSH algorithm techniques to the item listings to generate and assign hashes for each of the item features and components. The LSH module 240 may receive the item listing at the time of creation and generate two or more hashes for each of the item components included within the item listing. A hash value, (e.g., a hash), is a number generated from a string of text, or piece of data. The hash is substantially smaller than the text itself, and is generated in such a way that it is extremely unlikely that some other text will produce the same hash value. Thus, a hash may be expressed as a sequence of bits that describe individual elements (e.g., item components) of an item. For example, the LSH module 240 may generate two or more hashes for the item image, two or more hashes for the item description, and so on. The LSH module 240 may then index and store the hashes within a database (e.g., database 126).

The signature module 250 is configured to receive the hashes corresponding to an item listing, generated by the LSH module 240, and generate signatures based on the hashes. A signature may be defined as a set of hashes, where all the hashes in a signature describe the various components of an item listing. For example, a signature might include a set of hashes corresponding to an image of an item listing, a set of hashes corresponding to a title of an item listing, and so on. Thus, a signature may define the content of an item listing. The signature module 250 indexes and assigns the generated signature to the item listing.

The similar item identification module 260 is configured to identify similar or equivalent item listings based on the hashes and the corresponding signatures. The similar item identification module 260 may be configured to identify similar or equivalent item listings responsive to receiving an indication (e.g., from the search module 210) that a search request has been received and the search module 210 has retrieved a set of search results. Prior to displaying the set of search results at the client device (e.g., client device 110), the similar item identification module 260 identifies any similar or equivalent item listings within the set of search results. For example, the similar item identification module 260 identifies two or more listings pertaining to the same tangible object, and marks the duplicate listings as equivalents.

In some example embodiments, the similar item identification module 260 applies an LSH algorithm to the item listings to determine if the item listings are similar. For example, two documents (e.g., components of an item listing), A and B may be deemed similar by the similar item identification module 260 if the following condition is met:

```
AND(
    OR( A.dup0 == B.dup0, A.dup1 == B.dup1, A.dup2 == B.dup2 ),
    OR( A.dup3 == B.dup3, A.dup4 == B.dup4 )
)
```

Where dup0, dup1, and dup2 represent hashes corresponding to a single item component of an item listing, and were obtained by applying an LSH algorithm to the item listing at the time of listing creation by the LSH module 240. Thus, the above condition expresses that at least one hash must be equivalent between documents A and B in order for the documents (e.g., the item component, such as a listing title) to be deemed similar.

Thus, if additional hashes are obtained from another document (e.g., another item component, such as an image), for example dup3, and dup4, the above expression states that there must be at least one match among the hashes for the additional item component to be considered similar. The similar item identification module 260 may therefore deem two item listings similar when each item component between the two or more item listings being compared is determined to be similar based on the above expression. The similar item identification module 260 may therefore deem two or more item listings similar if the following condition is met:

```
IF(
    AND(
        OR( A.dup0 == B.dup0, A.dup1 == B.dup1,
        A.dup2 == B.dup2 ),
        OR( A.dup3 == B.dup3, A.dup4 == B.dup4 )
    ),
    AND(
        OR( A.dup0 == B.dup0, A.dup1 == B.dup1 ),
        OR( A.dup3 == B.dup3, A.dup4 == B.dup4 )
    )
)
```

Thus, according to the above expression, when all of the item components of two or more item listings are determined to be similar, then the item listings themselves are determined to be similar.

In some example embodiments, after identifying two or more similar item listings among a set of search results, the similar item identification module 260 may mark the similar item listings as similar, or equivalent, and transmit instructions to the ranking module 220 in order to modify the order of the search results. For example, the ranking module 220 may receive a set of search results from the search module 210, with all similar or equivalent item listings marked by the similar item identification module 260. Responsive to receiving the indication that the set of search results includes similar or equivalent item listings, the ranking module 220 may "demote" the duplicative item listings such that they are at a lower ranking within the set of search results. The modified set of search results may then be routed to the communications module 270, which is configured to cause display of the set of search results within a graphical user interface of the marketplace application, at a client device (e.g., client device 110).

Figure 3:
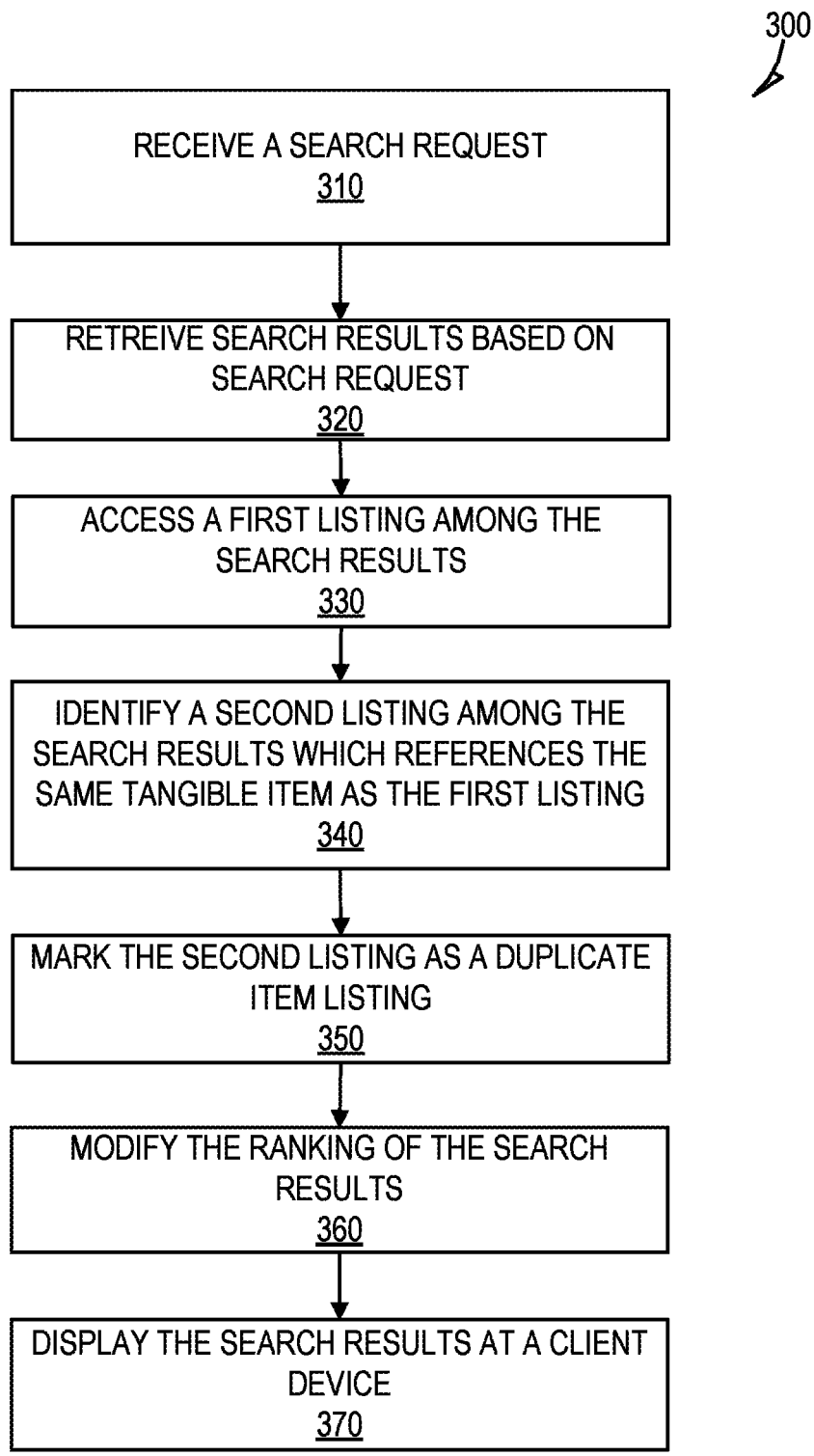
FIG. 3 is a flowchart illustrating a method 300 for retrieving a set of search results comprising item listings, and identifying duplicative item listings among the set of search results, according to various example embodiments.

FIG. 3 is a flowchart illustrating a method 300 for retrieving a set of search results comprising item listings, and identifying duplicative item listings among the set of search results, according to various example embodiments. Operations of the method 300 may be performed by the modules described above with respect to FIG. 2. As shown in FIG. 3, the method 300 may include operations 310, 320, 330, 340, 350, 360, and 370.

In operation 310, the search module 210 receives a search request, including one or more search criteria, from a client device (e.g., client device 110). At operation 320, the search module 210 may then retrieve a set of search results based on at least some of the received search criteria. This may be performed by searching the database(s) 126 for the search results (e.g., a particular item listing), selecting the search results based on at least some of the search criteria, and retrieving the set of search results. Having retrieved the set of search results, in some example embodiments, the search module 210 communicates the set of search results to the similar item identification module 260 in order to identify whether or not any of the item listing included in the set of search results are "similar," or equivalent to one another.

In operation 330, the similar item identification module 260 receives a set of search results, and accesses an item listing among the set of search results (e.g., a first item listing) in order to access the corresponding signature of the item listing and determine if any other item listings among the set of search results are similar, or indicate that an equivalent item listing was created and is included within the set of search results. If no item listings are determined to be equivalent, then the set of search results may be transmitted to the communication module 270, which can then deliver the set of search results to the client device 110.

In operation 340, the similar item identification module 260 identifies one or more item listings (e.g., a second listing) among the set of search results which is similar to the first item listing, and therefore indicates a duplicative item listing among the set of search results. Having identified one or more similar item listings, at operation 350 the similar item identification module 260 marks the one or more duplicate item listings (e.g., the second listing) as a similar or equivalent item listing.

In operation 360, the ranking module 220 receives an indication from the similar item identification module 260 that the set of search results includes one or more similar item listings. Responsive to receiving the indication that the set of search results includes one or more similar item listings, the ranking module 220 modifies the order of the set of search results. In some example embodiments, the ranking module 220 may "demote" the similar item listings such that they are presented at a position indicating a lower level of relevance among the set of search results (e.g., towards the bottom, or end of a list).

In operation 370, the communications module 270 receives the modified set of search results and causes the display of the set of search results at a client device (e.g., client device 110).

Figure 4:
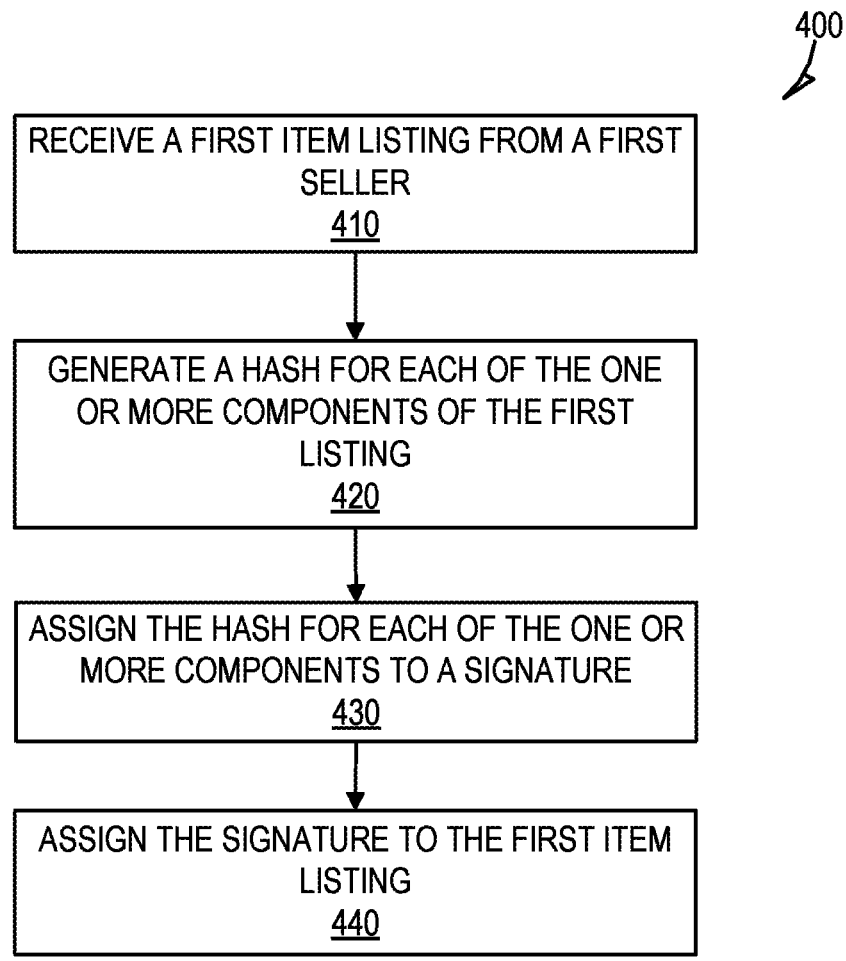
FIG. 4 is a flowchart illustrating a method 400 for generating a signature to assign to an item listing, according to various example embodiments.

FIG. 4 is a flowchart illustrating a method 400 for generating a signature to assign to an item listing at the time of listing creation, according to various example embodiments. Operations of the method 400 may be performed by the modules described above with respect to FIG. 2. As shown in FIG. 4, the method 400 may include operations 410, 420, 430, and 440.

In operation 410, the item listing module 230 receives one or more user inputs from a client device 110 defining the components of an item listing (e.g., a first item listing) to be presented in an online marketplace (e.g., the marketplace application). The components may include a listing title, a listing image, a listing description, and a price associated with the item for sale.

In operation 420, the LSH module 240 receives an indication that an item listing (e.g., the first item listing) has been created by the item listing module 230. The LSH module 240 retrieves the item listing, and each of the defined item components, and generates a set of two or more hashes for each of the item components. In some example embodiments, the LSH module 240 may be configured to generate a distinct, pre-defined number of hashes for each item component, based on the item component type. For example, the LSH module 240 may be configured to generate four hashes for all item listings titles, and two hashes for all item listing prices, or any other pre-defined number. After generating the hashes for each item component of the item listing, the LSH module 240 indexes and stores the hashes within a database (e.g., database 126).

In operation 430, after the LSH module 240 has defined a set of hashes for each of the item components of the item listing (e.g., the first item listing), the signature module 250 retrieves the hashes and assigns them to a signature. Thus, the signature comprises a set of hashes corresponding to an item listing. At operation 440, after assigning the hashes to a signature, the signature may be assigned to the item listing.

Figure 5A:
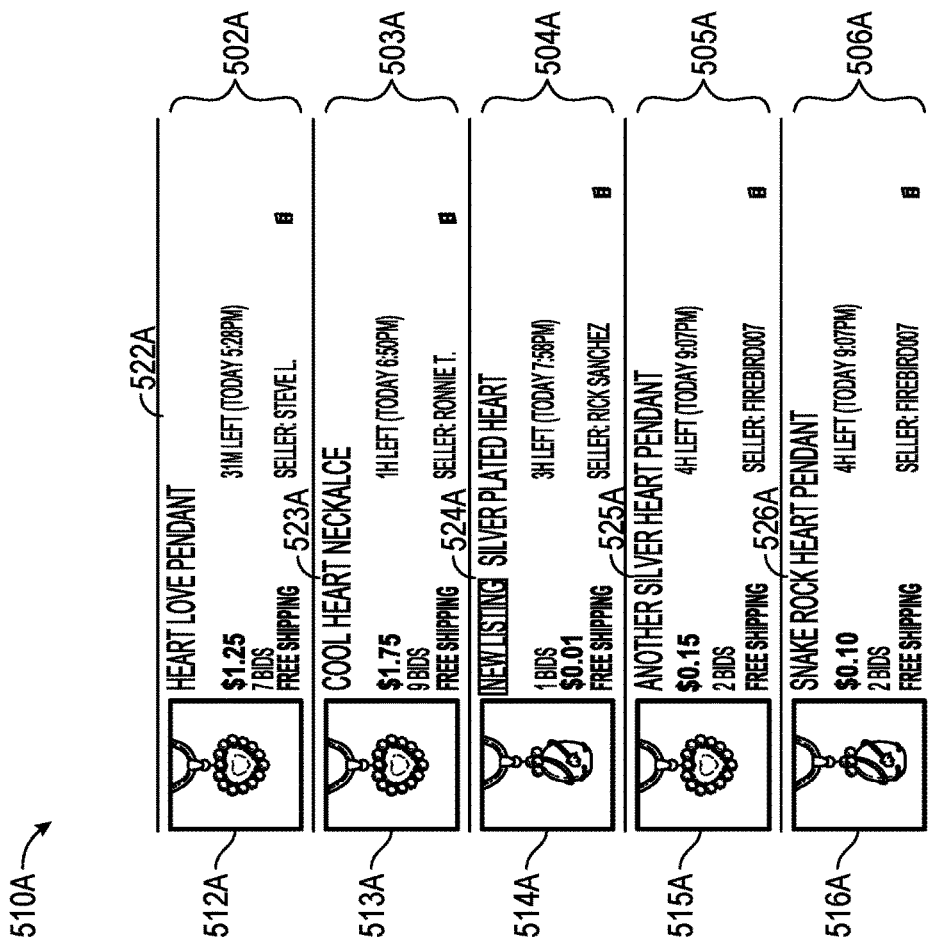
FIG. 5A depicts a diagram illustrating a set of search results including multiple duplicative item listings, according to various example embodiments.

FIG. 5A depicts a diagram illustrating a set of search results 501A retrieved by the search module 210, and presented at a client device 110 by the communications module 270, prior to demoting any similar item listings. The set of search results 501A is shown to include multiple duplicative item listings (e.g., similar item listings), 502A, 503A, 504A, 505A, and 506A, according to various example embodiments. The item listings are also shown to include corresponding item components, including item listing images 512A. 513A. 514A. 515A, and 516A, as well as item listing titles 522A, 523A, 524A, 525A, and 526A.

Item listings 502A, 503A, and 505A represent one group of similar item listings, and item listings 504A and 506A represent a second group of similar item listings. As illustrated by FIG. 5A, item listings 502A, 503A, and 505A are shown to include duplicate listing images 512A, 513A, and 515A. The corresponding listing titles 522A, 523A, and 525A are shown to be similar, but not identical.

Figure 5B:
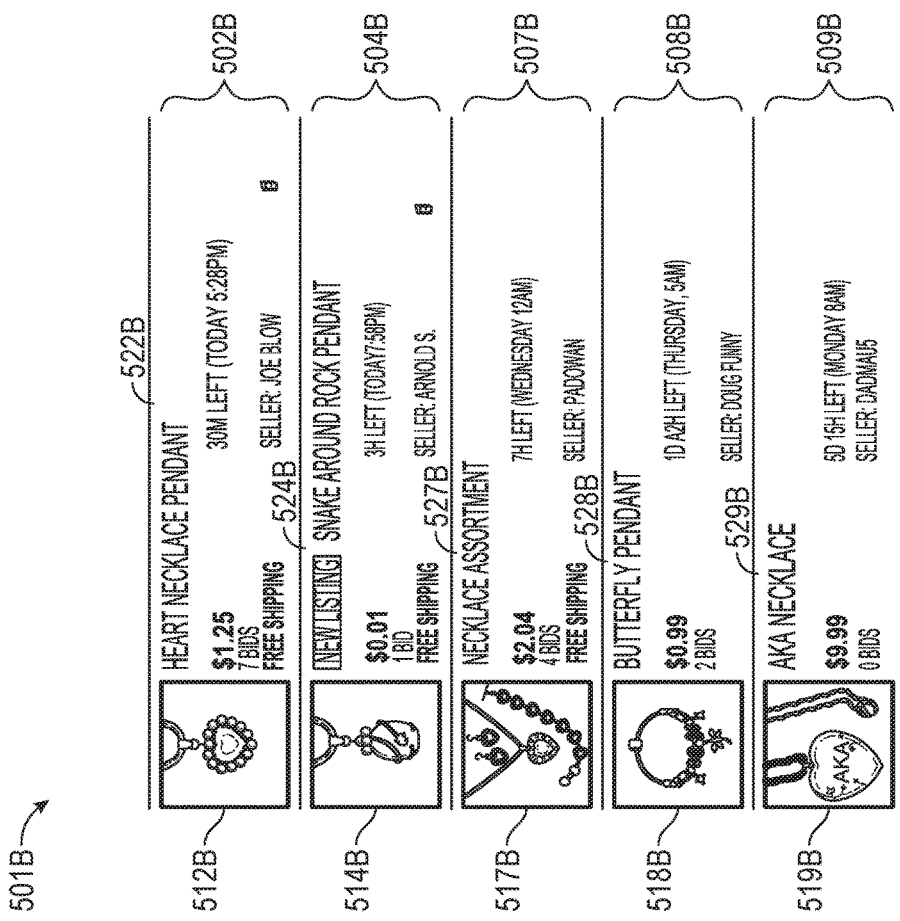
FIG. 5B depicts a diagram illustrating a set of search results after the duplicative item listings have been demoted, according to various example embodiments.

FIG. 5B depicts a diagram illustrating a set of search results 501B retrieved by the search module 210, and presented at a client device 110 by the communications module 270, after similar item listings have been demoted. The set of search results 501B is shown to include distinct item listings 502B, 504B, 507B, 508B, and 509B. Each of the distinct item listings includes a set of distinct item components such as item listing images 512B, 514B, 517B, 518B, and 519B, and item listing titles 522B, 524B, 527B, 528B, and 529B.

As illustrated by FIG. 5B, the similar item listings illustrated in FIG. 5A are identified and demoted by the modules of the near-identical multi-faceted entity identification system 150. For example, the similar item identification module 260 accesses the signature of a first item listing (e.g., item listing 502A), and by applying an LSH algorithm, determines that the item listings 503A and 505A are similar. After identifying that one or more of the item listings among the set of search results 501A are similar, the ranking module 220 modifies the rankings of the item listings comprising the set of search results 501A by demoting the similar item listings (e.g., 503A and 505A). Thus, search results 501B illustrate a set of search results after all similar item listings have been demoted.

Example Machine Architecture and Machine-Readable Medium

Figure 6:
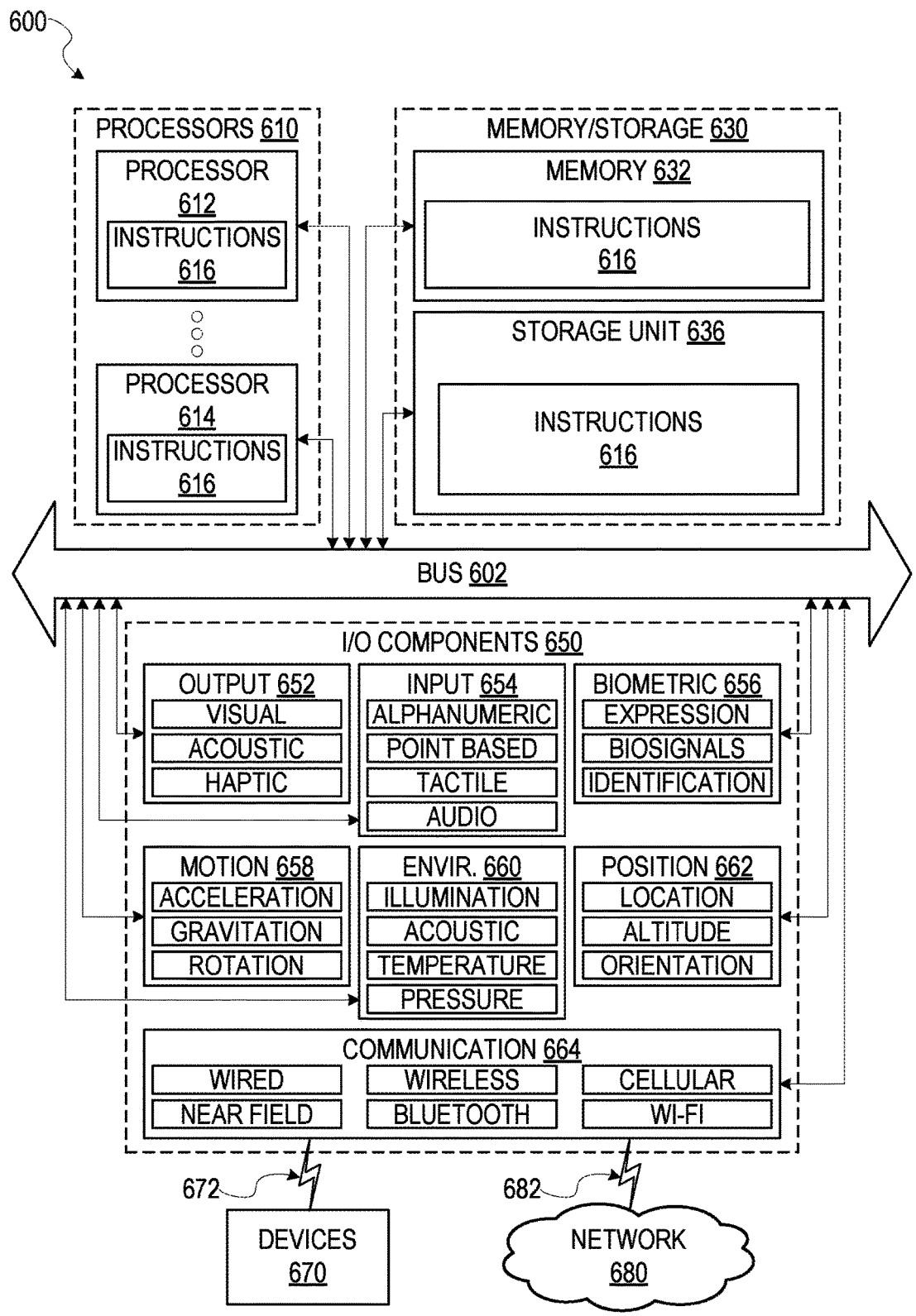
FIG. 6 is a diagrammatic representation of a machine in the example form of a computer system within which a set of instructions, for causing the machine to perform any one or more of the methodologies discussed herein, may be executed.

FIG. 6 is a block diagram illustrating components of a machine 600, according to some example embodiments, able to read instructions from a machine-readable medium (e.g., a machine-readable storage medium) and perform any one or more of the methodologies discussed herein. Specifically, FIG. 6 shows a diagrammatic representation of the machine 600 in the example form of a computer system, within which instructions 616 (e.g., software, a program, an application, an applet, an app, or other executable code) for causing the machine 600 to perform any one or more of the methodologies discussed herein may be executed. For example the instructions may cause the machine to execute the flow diagrams of FIGS. 3-4. Additionally, or alternatively, the instructions may implement the modules of FIG. 2. The instructions transform the general, non-programmed machine into a particular machine programmed to carry out the described and illustrated functions in the manner described. In alternative embodiments, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 616, sequentially or otherwise, that specify actions to be taken by machine 600. Further, while only a single machine 600 is illustrated, the term "machine" shall also be taken to include a collection of machines 600 that individually or jointly execute the instructions 616 to perform any one or more of the methodologies discussed herein.

The machine 600 may include processors 610, memory 630, and I/O components 650, which may be configured to communicate with each other such as via a bus 602. In an example embodiment, the processors 610 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 612 and processor 614 that may execute instructions 616. The term "processor" is intended to include multi-core processor that may comprise two or more independent processors (sometimes referred to as "cores") that may execute instructions contemporaneously. Although FIG. 6 shows multiple processors, the machine 600 may include a single processor with a single core, a single processor with multiple cores (e.g., a multi-core process), multiple processors with a single core, multiple processors with multiples cores, or any combination thereof.

The memory/storage 630 may include a memory 632, such as a main memory, or other memory storage, and a storage unit 636, both accessible to the processors 610 such as via the bus 602. The storage unit 636 and memory 632 store the instructions 616 embodying any one or more of the methodologies or functions described herein. The instructions 616 may also reside, completely or partially, within the memory 632, within the storage unit 636, within at least one of the processors 610 (e.g., within the processor's cache memory), or any suitable combination thereof, during execution thereof by the machine 600. Accordingly, the memory 632, the storage unit 636, and the memory of processors 610 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 616. The term "machine-readable medium" shall also be taken to include any medium, or combination of multiple media, that is capable of storing instructions (e.g., instructions 616) for execution by a machine (e.g., machine 600), such that the instructions, when executed by one or more processors of the machine 600 (e.g., processors 610), cause the machine 600 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 650 may include a wide variety of components to receive input, provide output, produce output, transmit information, exchange information, capture measurements, and so on. The specific I/O components 650 that are included in a particular machine will depend on the type of machine. For example, portable machines such as mobile phones will likely include a touch input device or other such input mechanisms, while a headless server machine will likely not include such a touch input device. It will be appreciated that the I/O components 650 may include many other components that are not shown in FIG. 6. The I/O components 650 are grouped according to functionality merely for simplifying the following discussion and the grouping is in no way limiting. In various example embodiments, the I/O components 650 may include output components 652 and input components 654. The output components 652 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 654 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 650 may include biometric components 656, motion components 658, environmental components 660, or position components 662 among a wide array of other components. For example, the biometric components 656 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 658 may include acceleration sensor components (e.g., accelerometer), gravitation sensor components, rotation sensor components (e.g., gyroscope), and so forth. The environmental components 660 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 662 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 650 may include communication components 664 operable to couple the machine 600 to a network 680 or devices 670 via coupling 682 and coupling 672 respectively. For example, the communication components 664 may include a network interface component or other suitable device to interface with the network 680. In further examples, communication components 664 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 670 may be another machine or any of a wide variety of peripheral devices (e.g., a peripheral device coupled via a Universal Serial Bus (USB)).

Moreover, the communication components 664 may detect identifiers or include components operable to detect identifiers. For example, the communication components 664 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 664, such as, location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 680 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 680 or a portion of the network 680 may include a wireless or cellular network and the coupling 682 may be a Code Division Multiple Access (CDMA) connection, a Global System for Mobile communications (GSM) connection, or other type of cellular or wireless coupling. In this example, the coupling 682 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 616 may be transmitted or received over the network 680 using a transmission medium via a network interface device (e.g., a network interface component included in the communication components 664) and utilizing any one of a number of well-known transfer protocols (e.g., hypertext transfer protocol (HTTP)). Similarly, the instructions 616 may be transmitted or received using a transmission medium via the coupling 672 (e.g., a peer-to-peer coupling) to devices 670. The term "transmission medium" shall be taken to include any intangible medium that is capable of storing, encoding, or carrying instructions 616 for execution by the machine 600, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
receiving, from a client device, a search request;
retrieving a set of search results based on the search request, the set of search results including a plurality of item listings, the plurality of item listings being ranked based on relevance to the search request;
accessing a first item listing from the plurality of item listings, the first item listing referencing a tangible item;
identifying a second item listing from the plurality of item listings, the second item listing referencing the tangible item;
marking the second item listing as a duplicate item listing based on the second item listing referencing the tangible item referenced by the first item listing;
modifying the ranking of the second item listing based on the second item listing being identified as the duplicate item listing; and
causing display of the set of search results at the client device, the set of search results being ranked in accordance with the modified ranking of the second item listing.

2. The method of claim 1, wherein the modifying the ranking includes demoting the second item listing in the set of search results.

3. The method of claim 1, further comprising:
receiving the first item listing from a first seller, the first item listing including one or more components;
generating a hash for each of the one or more components of the first item listing;
assigning the hash for each of the one or more components to a first signature; and
assigning the first signature to the first item listing.

4. The method of claim 3, wherein multiple hashes are generated for each of the one or more components of the first item listing.

5. The method of claim 3, wherein the second item listing includes a second signature, and the second item listing is marked as the duplicate item listing based on:
determining that the first signature of the first item listing is similar to the second signature of the second item listing.

6. The method of claim 3, wherein each of the plurality of item listings include a corresponding seller, a corresponding item, and a corresponding signature, and the method further comprises:
determining that the first item listing is a duplicate of one or more of the plurality of item listings when the first seller and the corresponding seller of the one or more of the plurality of item listings are identical and the tangible item of the first item listing and the corresponding item of the one or more of the plurality of item listings are identical.

7. The method of claim 3, wherein the one or more components include:
a title;
an image;
a description;
a category; and a price value.

8. The method of claim 5, wherein the determining that the first signature of the first item listing is similar to the second signature of the second item listing comprises:
determining that each of the one or more components of the first item listing are similar to each of one or more components of the second item listing.

9. The method of claim 3, wherein the generating the hash includes applying a locality sensitive hashing algorithm to the first item listing.

10. A system comprising:
a search module comprising one or more processors and configured to receive, from a client device, a search request;
the search module further configured to retrieve a set of search results based on the search request, the set of search results including a plurality of item listings, the plurality of item listings being ranked based on relevance to the search request;
a similar item identification module comprising one or more processors and configured to access a first item listing from the plurality of item listings, the first item listing referencing a tangible item;
the similar item identification module further configured to identify a second item listing from the plurality of item listings, the second item listing referencing the tangible item;
the similar item identification module further configured to mark the second item listing as a duplicate item listing based on the second item listing referencing the tangible item referenced by the first item listing;
a ranking module comprising one or more processors and configured to modify the ranking of the second item listing based on the second item listing being identified as the duplicate item listing; and
a communication module comprising one or more processors and configured to cause display of the set of search results at the client device, the set of search results being ranked in accordance with the modified ranking of the second item listing.

11. The system of claim 10, wherein:
the modification of the ranking by the ranking module includes demoting the second item listing in the set of search results.

12. The system of claim 10, further comprising:
an item listing module comprising one or more processors and configured to receive the first item listing from a first seller, the first item listing including one or more components;
a locality sensitive hashing (LSH) module comprising one or more processors and configured to generate a hash for each of the one or more components of the first item listing;
a signature module comprising one or more processors and configured to assign the hash for each of the one or more components to a first signature; and
the signature module further configured to assign the first signature to the first item listing.

13. The system of claim 12, wherein:
the LSH module is further configured to generate multiple hashes for each of the one or more components of the first item listing.

14. The system of claim 12, wherein:
the second item listing includes a second signature, and the similar item identification module is further configured to determine that the first signature of the first item listing is similar to the second signature of the second item listing.

15. The system of claim 12, wherein:
each of the plurality of item listings include a corresponding seller, a corresponding item, and a corresponding signature, and the similar item identification module is further configured to determine that the first item listing is a duplicate of one or more of the plurality of item listings when the first seller and the corresponding seller of the one or more of the plurality of item listings are identical and the tangible item of the first item listing and the corresponding item of the one or more of the plurality of item listings are identical.

16. The system of claim 12, wherein:
the one or more components received by the item listing module include:
a title;
an image;
a description;
a category; and
a price value.

17. The method of claim 14, wherein:
the similar item identification module is further configured to determine that each of the one or more components of the first item are similar to each of one or more components of the second item listing.

18. The system of claim 12, wherein:
the LSH module is further configured to generate the hash by applying a locality sensitive hashing algorithm to the first item listing.

19. A non-transitory machine-readable storage medium comprising instructions that, when executed by one or more processors of a machine, cause the machine to perform operations comprising:
receiving, from a client device, a search request;
retrieving a set of search results based on the search request, the set of search results including a plurality of item listings, the plurality of item listings being ranked based on relevance to the search request;
accessing a first item listing from the plurality of item listings, the first item listing referencing a tangible item;
identifying a second item listing from the plurality of item listings, the second item listing referencing the tangible item;
marking the second item listing as a duplicate item listing based on the second item listing referencing the tangible item referenced by the first item listing;
modifying the ranking of the second item listing based on the second item listing being identified as the duplicate item listing; and
causing display of the set of search results at the client device, the set of search results being ranked in accordance with the modified ranking of the second item listing.

20. The non-transitory machine-readable storage medium of claim 19, further comprising:
receiving the first item listing from a first seller, the first item listing including one or more components;
generating a hash for each of the one or more components of the first item listing;
assigning the hash for each of the one or more components to a first signature; and
assigning the first signature to the first item listing.

* * * * *